UNITED STATES PATENT OFFICE.

GEORGE B. BAIR, OF BALTIMORE, MARYLAND.

IMPROVEMENT IN PAINTS FOR SHIPS' BOTTOMS.

Specification forming part of Letters Patent No. 128,777, dated July 9, 1872.

*To whom it may concern:*

Be it known that I, GEORGE B. BAIR, of the city and county of Baltimore and State of Maryland, have invented an Improved Paint for Ships' Bottoms and other purposes, of which the following is a specification:

My improved copper paint is composed of arsenite of copper, arsenate of copper, oxide of copper, sulphuret of antimony, and wood-tar, prepared by the action of certain chemicals, taken in about the following proportions: Arsenite of copper, eight per cent. by weight; arsenate of copper, seven per cent. by weight; oxide of copper, nineteen per cent. by weight; sulphuret of antimony, six per cent. by weight; Prepared wood-tar, sixty per cent. by weight.

Arsenite of copper is prepared by dissolving arsenious acid into an alkaline solution of soda or potassa and gradually adding it to a solution of sulphate of copper. Arsenite of copper is precipitated, which is collected, washed, and dried. Arsenate of copper is prepared by distilling a given quantity of arsenious acid with nitric and hydrochloric acids until the contents of the retort have acquired the proper consistency. It is then dried with a gentle heat, and the arsenic acid thus formed is dissolved in a solution of soda and gradually added to a solution of sulphate of copper. Arsenate of copper is precipitated, which is collected, washed, and dried. These two compounds of copper are then finely powdered and ground in a mill with prepared wood-tar.

Both of the above-named compounds are most virulent poisons, and are certainly very effectual in preserving the bottoms of vessels from the destructive influence of worms, and for preventing the decay of organic substances.

Oxide of copper, such as is used in this paint, may be prepared either by roasting the pure sulphuret of copper in a current of air to drive off the sulphur and supply its place with oxygen, or by exposing sheet-copper to a red heat in the air and separating the black scales which form upon it by sudden cooling, this latter method being substantially the source of that kind of oxide of copper known in commerce as "copper scales."

This compound of copper, when finely divided and diffused through wood-tar, forms an eligible compound for vessels' bottoms; but experience has shown that in this manner the "corrosion" or chemical changes which the oxide of copper undergoes takes place too rapidly, and for a short time only protects the vessel from the adhesion of barnacles, shells, &c.; hence the introduction of sulphuret of antimony, which, in the proportion above named, has proven by experience to prevent this rapid corrosion, and yet allow it to go on sufficiently to protect the vessel.

I am aware that oxide of copper and antimony have been previously employed as ingredients in paints for similar purposes; but they have never before been combined, to my knowledge, with arsenite and arsenate of copper, both of which possess valuable and desirable properties for the protection and preservation of the bottoms of vessels.

Wood-tar is used as an ingredient of the paint on account of its adhesive qualities, and, when prepared by the action of certain chemicals, becomes durable and very impervious to the action of water, and consequently well adapted for holding the other ingredients of the paint firmly to the surfaces to which they are applied.

Instead of using both the arsenite and arsenate of copper, either of said compounds may be used singly in combination with the other ingredients hereinbefore named.

I do not confine myself to the exact proportions stated of the several ingredients.

I am also aware that in the patent of James G. Tarr and Augustus M. Wonson white arsenic, (not arsenite nor arsenate of copper,) wood-tar, naphtha of coal-tar, and oxide of copper, in connection with other ingredients, are described. I am further aware that arsenate and arsenite of copper are described in the patent of James Bowker; but I am not aware that a compound in which oxide of copper, sulphuret of antimony, and tar are ingredients has had arsenate or arsenite of copper, or both arsenate and arsenite of copper, added to it.

What I claim as my invention, and desire to secure by Letters Patent, is—

An improved copper paint for ships' bottoms and other purposes, composed of arsenite or arsenate of copper, or both arsenite and arsenate of copper, combined with oxide of copper, sulphuret of antimony, and prepared wood-tar, substantially as herein set forth.

In testimony whereof I have signed my name to this specification before two subscribing witnesses.

GEORGE B. BAIR.

Witnesses:
J. N. CAMPBELL,
EDM. F. BROWN.